March 12, 1929.　　J. ST. C. WERNIG　　1,705,040
AUTOMOBILE BUMPER
Filed Oct. 23, 1926　　2 Sheets-Sheet 1

INVENTOR
John St. Clair Wernig
BY
Joseph F. O'Brien
his ATTORNEY

March 12, 1929.  J. ST. C. WERNIG  1,705,040
AUTOMOBILE BUMPER
Filed Oct. 23, 1926  2 Sheets-Sheet 2
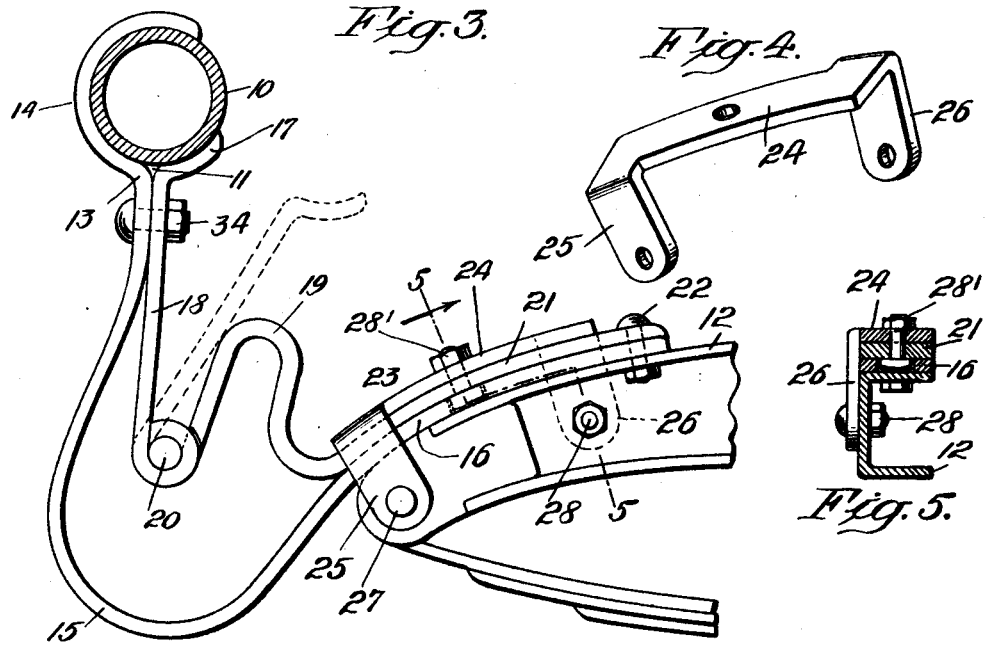
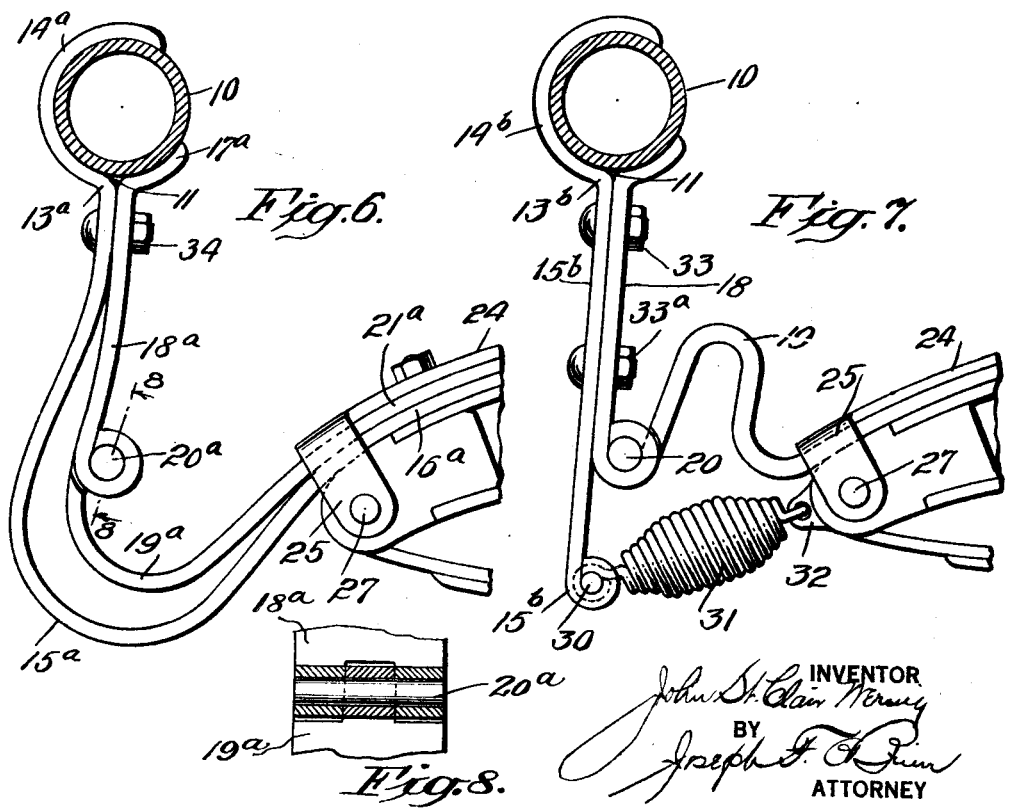

Patented Mar. 12, 1929.

1,705,040

UNITED STATES PATENT OFFICE.

JOHN ST. CLAIR WERNIG, OF BROOKLYN, NEW YORK.

AUTOMOBILE BUMPER.

Application filed October 23, 1926. Serial No. 143,579.

This invention relates to improvements in automobile bumpers.

One of the objects of this invention is to provide in a bumper, extremely simple supporting means for the impact member by the use of which the said impact member may be quickly and readily mounted and demounted.

Another object of the invention is to provide in an automobile bumper, spring mounting means for an impact member which will have qualities enabling it to yield sufficiently for the purpose of effectively absorbing ordinary light shocks without distortion and which will, furthermore, provide means which, when extraordinary shocks are encountered, come into action successively to reinforce the first-mentioned means for the purpose of effectively resisting such heavy shocks, thus preventing injury to the automobile.

Another object of the invention is to provide a mounting for impact members in which a mounting eye or loop for the impact member is composed of split loop portions formed at the ends of independent members connected together to lock the bar within a seat formed therebetween.

Another object of my invention is to provide a mounting for an impact member composed of a split-eye or split-loop formed at the ends of two cooperating members, one of which is hinged or pivoted to permit ready separation for insertion in the seat of the impact bar, and a ready closing and connection together of the members for said impact bar, and which mounting-forming members also preferably cooperate to take up ordinary shocks with a suitable yielding resistance thereto and the other comes into action successively with the first for jointly resisting shocks of greater magnitude.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 3 is a side elevation of a bracket showing the impact bar in section;

Fig. 4 is a perspective view of a clamping element for connecting spring brackets to the frame of the machine;

Fig. 5 is a section on the line 5—5 of Fig. 3, looking in the direction of the arrow;

Fig. 6 is a side elevation of a modified form of my bracket construction;

Fig. 7 is a similar view of another modified form of my invention; and

Fig. 8 is a section on the line 8—8 of Fig. 6 showing, in detail, the hinge connection illustrated in said Fig. 6 and also in Figs. 3 and 7.

Figure 1:
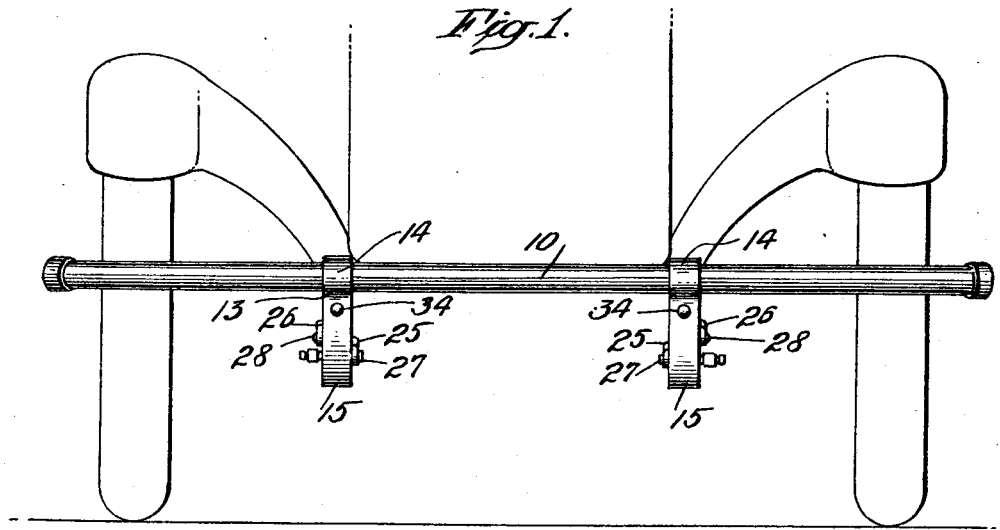
Fig. 1 is a front view of an automobile bumper embodying my invention.
Figure 2:
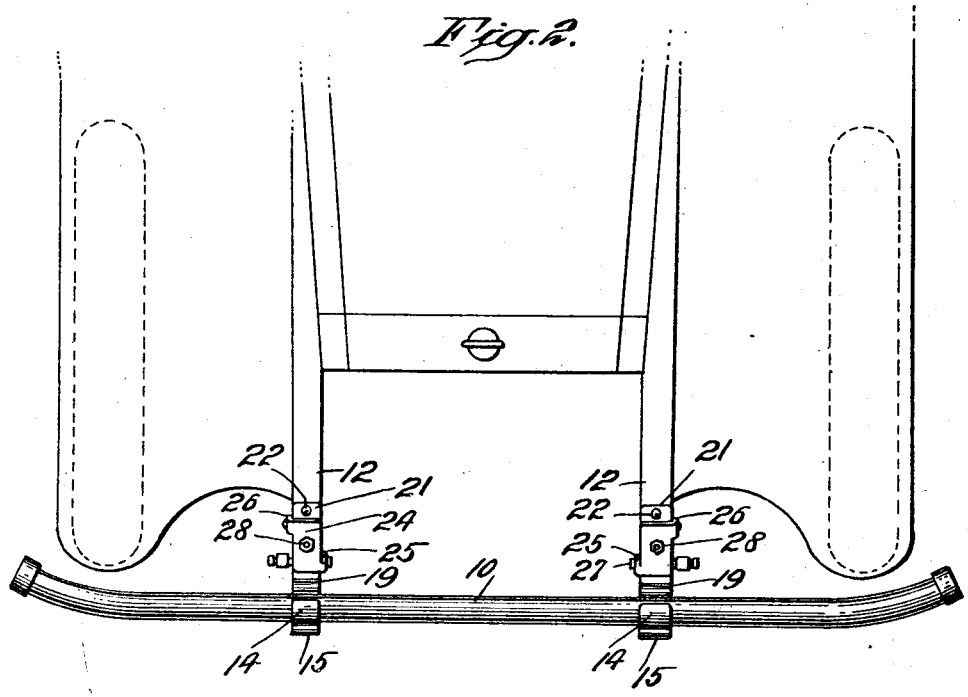
Fig. 2 is a plan view of the device shown in Fig. 1.

Referring now to these drawings, Figs. 1 and 2 illustrate in front elevation and in plan respectively, the position of the bumper and supporting members at the front end of an automobile, while Figs. 3, 6 and 7 show in side elevation, several forms of mounting brackets embodying my invention, the form shown in Fig. 6 being the preferred form of my invention.

Referring now generally to all the views of the drawings, 10 indicates an impact member of an automobile bumper which, in the preferred embodiment shown, comprises a round bar or tube closed at its ends and of a length adapted to extend transversely in front of the end of the vehicle substantially from the outside edge of one fender to the corresponding edge of the opposite fender of the vehicle and across the path of the wheel beneath these fenders and this bar may be of any desired shape or configuration and is supported by similar spring brackets connected to the frame ends 12, 12 of the automobile. Said impact bar is mounted within a split mounting seat of an eye-formation 11 formed in each of said brackets. One of the members of each bracket comprises an outer primary spring adapted without the retarding action of any other member to effectively absorb relatively light shocks, while the other member is adapted to be brought into action when a heavy shock beyond a given degree in force is exerted, for the purpose of reinforcing and backing up the primary member so as to cause both members jointly thereafter to absorb such shock of greater magnitude.

In Fig. 3, part of the split mounting seat 11 is formed by providing at the upper or outer end or extremity of a primary metal bar 13 an arcuate split seat portion 14 comprising a major arc, the intermediate portion of said member being formed in a wide loop 15 having a terminal end 16 fastened on the horn 12 of the automobile chassis as hereinafter more particularly specified, and the other complementary portion of said seat comprising a minor arc 17 is formed on a hinged portion 18 pivoted in substantially the same manner as shown in detail in Fig. 8, at the end of a secondary resisting loop 19 by means of a pivot pin 20, the opposite terminal end 21 of said loop bar 19 being likewise fastened to the horn or frame end 12 at the front of the automobile. The ends 16 and 21 of the loop bars 15 and 19 respectively, are brought into overlapping relationship on the top of the frame ends and are jointly fastened at the ends thereof to the frame by a bolt 22 and are also preferably fastened to said frame by means of a bracket bar 23 comprising a body portion 24 and oppositely-disposed lugs 25 and 26 respectively which are fastened to the frame ends by bolts 27 and 28. The ends 16 and 21 of the bars 15 and 19 are independently fastened to the bracket bar 23 by means of a bolt 28′.

In the preferred embodiment of my invention illustrated in Fig. 6, the eye-formation 11 is similarly formed at the end of a primary member 13ª having a major portion of the split eye 14ª formed at the upper end thereof and a wide loop 15ª similarly terminating in an end 16ª fastened to the automobile frame end 12 in a manner in all respects similar to that described in regard to Fig. 3. In this embodiment, the minor portion 17ª of the split mounting or seat 11 is similarly formed in a hinged bar 18ª pivoted as shown in section in Fig. 8 at 20ª to a secondary shock resisting member 19ª having a downwardly-disposed loop arranged in spaced relationship from the loop 15ª but in vertical registration therewith, the opposite end 21ª of the said bar 18ª overlying the end 16ª of the primary bar and being fastened thereto and to the frame end in a manner similar in all respects to that hereinabove described in relation to Fig. 3.

In Fig. 7, I have shown another modified form of my invention in which the outer portion of the split mounting 11 is formed in a member 13ᵇ having at one end a major portion 14ᵇ of the split seat and having at its other end as at 30, a resilient connection with the frame end 12 by means of an expansion spring 31 stretched between the end 15ᵇ of the member 13ᵇ and an eye 32 suitably fastened to the frame end 12. The other cooperating member, having a minor portion of a split seat, is in all respects similar to that hereinabove described in relation to Fig. 3.

In all forms of this device, it will be seen that a split seat for the impact member is formed between the opposite ends of two cooperating members, the intermediate portions of which may be fastened together by a bolt or bolts.

In Figs. 3 and 6, a single bolt 34 is utilized, while in Fig. 7 a pair of bolts 33, 33ª are utilized for this purpose. It will be seen, furthermore, that in each of these cases, relatively light shocks will be taken up by the outer member, thus in Figs. 3 and 6, the loop members 15, 15ª will absorb any such light shocks and the pivoted portions 18 and 18ª merely rock therewith and, furthermore, that when a shock of relatively greater magnitude is encountered, the outer loop bar will be bent into contact with the inner loop bar which will thereupon come into action successively so as to resist such shocks of greater magnitude.

In Fig. 7, the primary or initial shocks will be taken up by the spring 31 and shocks of greater magnitude will, thereafter, be taken up by the loop bar 19.

It will be seen that by the use of the pivoted member 18, the primary member 15ᵇ is steadied and assisted in its supporting function without, however, detracting from its resilience and absorbing qualities for light shocks and this member 18 thus forms an articulating or flexible link between the primary member 15ᵇ and relatively more rigid secondary bar 19 which assists in retaining the opposite ends of the impact member in alignment and thus, as above indicated, the members constitute a flexible link between the primary and secondary members, the latter of which is relatively rigid, thus tethering the primary member 15ᵇ to prevent outward swinging or wobbling but in no way affecting its independent shock-absorbing action. This pivoted member also retains the primary outer member in vertical alignment with the rear or inner secondary member and thus further prevents disalignment of the ends of the bumper.

Having described my invention, I claim:—

1. A bumper embodying an impact member and supporting elements for said impact member, each element comprising a pair of cooperating members, one of which is mounted to swing in relation to the other, and each of which is formed to provide a portion of a split mounting seat for said impact member.

2. A bumper embodying an impact member and supporting elements for said impact member, each element comprising a pair of cooperating members, one of which is mounted to swing pivotally in relation to the other, and each of which is formed to provide a portion of a split mounting seat for said impact member.

3. A bumper embodying an impact member and supporting elements for said impact member, each element comprising a pair of cooperating members, each of which members has an integral portion of a split mounting seat for said impact member.

4. A bumper embodying an impact member and supporting elements for said impact member, each element comprising a pair of cooperating members, one of which members is provided with a major portion of a split mounting seat for the impact member and the other is formed and arranged to provide a minor portion of said seat.

5. A bumper embodying an impact member and supporting elements for said impact member, each element comprising a pair of cooperating members, one of which is mounted to swing in relation to the other, each member of said pair of cooperating members being formed to provide a portion of a split mounting seat for said impact member, said cooperating members extending vertically, having said split-seat portions abutting each other at their ends, and fastening means arranged intermediate the ends of said members for connecting said members together and clamping the impact members between the split-seat portions of said cooperating members.

6. A bumper embodying an impact member and supporting elements for said impact member, each element comprising a pair of cooperating members, one of which is mounted to swing pivotally in relation to the other, each member of said pair of cooperating members being formed to provide a portion of a split mounting seat for said impact cooperating member, said members extending vertically, having said split-seat portions abutting each other at their ends, and fastening means arranged intermediate the ends of said members for connecting said members together and clamping the impact members between the split-seat portions of said cooperating members.

7. A bumper embodying an impact member and supporting elements for said impact member, each element composed of a pair of cooperating members, one of which comprises a metal bar having an integral spring loop and movable independently upon impact for a portion of its movement, and the other member comprises a reinforcing metal bar arranged behind and in the path of movement of the other member to engage and reinforce the same successively upon movement of the first-mentioned bar beyond a predetermined extent.

8. A bumper embodying an impact member and supporting elements for said impact member, each element composed of a pair of cooperating members, one of which comprises a metal bar having a resilient connection between the car chassis and said impact member, said bar being movable independently upon impact for a portion of its movement, and the other member comprises a reinforcing metal bar arranged behind and in the path of movement of the other member to engage and reinforce the same successively upon movement of the first-mentioned bar beyond a predetermined extent.

9. A bumper embodying an impact member and supporting elements for said impact member, each element composed of a pair of cooperating members, one of which comprises a metal bar having a resilient connection between the car chassis and said impact member, said bar being movable independently upon impact for a portion of its movement, and the other member comprises a reinforcing metal bar arranged behind and in the path of movement of the other member to engage and reinforce the same successively upon movement of the first-mentioned bar beyond a predetermined extent, said two members having a hinged connection with each other.

10. A bumper embodying an impact member and supporting elements for said impact member, each element composed of a pair of cooperating members, one of which comprises a primary metal bar and the other member comprises a secondary reinforcing metal bar, the former having an integral spring loop movable upon impact independently for a portion of its total movement and the other member comprising a reinforcing metal bar arranged behind and in the path of movement of said first member to engage and reinforce the same successively upon movement of the first-mentioned bar beyond a predetermined extent, a connection between said members comprising a link member having a pivotal connection with the secondary member and also fastened to the primary member.

11. A bumper embodying an impact member and supporting elements for said impact member, each element composed of a pair of cooperating members, one of which comprises a primary metal bar and the other member comprises a secondary reinforcing metal bar, the former having an integral spring loop movable upon impact independently for a portion of its total movement and the other member comprising a reinforcing metal bar arranged behind and in the path of movement of said first member to engage and reinforce the same successively upon movement of the first-mentioned bar beyond a predetermined extent, a connection between said members comprising a link member having a pivotal connection with the secondary member and also fastened to the primary member, said primary member having integrally formed therewith a portion of a split seat for the impact member and said link member being formed to provide a complementary seat portion of said split seat.

12. A bumper embodying an impact member and supporting elements for said impact member, each element composed of a pair of cooperating members, one of which comprises a primary metal bar and the other member comprises a secondary reinforcing metal bar, the former having an integral spring loop movable upon impact independently for a portion of its total movement and the other member comprising a reinforcing metal bar arranged behind and in the path of movement of said first member to engage and reinforce the same successively upon movement of the first-mentioned bar beyond a predetermined extent, a connection between said members comprising a link member having a pivotal connection with the secondary member and also fastened to the primary member, said primary member having integrally formed therewith a portion of a split seat for the impact member and said link member being formed to provide a complementary seat portion of said split seat, and said primary member and said link member having a removable connection intermediate their ends to permit opening for insertion of the impact member and a clamping of the same therebetween.

In witness whereof, I have signed my name to the foregoing specification.

JOHN ST. CLAIR WERNIG.